United States Patent
Dimitrova et al.

(10) Patent No.: US 6,469,749 B1
(45) Date of Patent: Oct. 22, 2002

(54) AUTOMATIC SIGNATURE-BASED SPOTTING, LEARNING AND EXTRACTING OF COMMERCIALS AND OTHER VIDEO CONTENT

(75) Inventors: Nevenka Dimitrova, Yorktown Heights, NY (US); Thomas McGee, Garrison, NY (US); Lalitha Agnihotri, Fishkill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/417,288

(22) Filed: Oct. 13, 1999

(51) Int. Cl.[7] .......................... H04N 5/222; H04N 5/14; H04N 7/00; H04H 9/00

(52) U.S. Cl. ..................... 348/722; 348/907; 348/465; 348/700; 348/701; 725/14; 725/22

(58) Field of Search ................................. 348/722, 907, 348/700, 701, 465; 725/14, 22; 358/908, 84

(56) References Cited

U.S. PATENT DOCUMENTS

| | | | | | |
|---|---|---|---|---|---|
| 4,677,466 A | * | 6/1987 | Lert, Jr. et al. | ................ | 358/84 |
| 4,697,209 A | * | 9/1987 | Kiewit et al. | ................. | 358/84 |
| 4,739,398 A | * | 4/1988 | Thomas et al. | ................ | 358/84 |
| 4,857,999 A | * | 8/1989 | Welsh | ......................... | 358/84 |
| 4,945,412 A | * | 7/1990 | Kramer | ...................... | 358/84 |
| 5,019,899 A | * | 5/1991 | Boles et al. | ................... | 358/84 |
| 5,151,788 A | * | 9/1992 | Blum | ......................... | 358/188 |
| 5,621,454 A | * | 4/1997 | Ellis et al. | ..................... | 725/14 |
| 5,870,754 A | | 2/1999 | Diitrova et al. | ............. | 707/104 |
| 6,002,443 A | * | 12/1999 | Iggulden | ...................... | 348/553 |
| 6,100,941 A | * | 8/2000 | Dimitrova et al. | .......... | 348/700 |
| 6,137,544 A | * | 10/2000 | Dimitrova et al. | .......... | 348/700 |
| 6,185,363 B1 | * | 2/2001 | Dimitrova et al. | ............ | 386/69 |

OTHER PUBLICATIONS

"Color SuperHistograms for Video Representation", by N. Dimitrova et al, IEEE International Conference on Image Processing, Kobe, Japan 1999.

* cited by examiner

Primary Examiner—John Miller
Assistant Examiner—Paulos Natnael

(57) ABSTRACT

A video signal is processed to identify segments that are likely to be associated with a commercial or other particular type of video content. A signature is extracted from each of the segments so identified, and the extracted signatures are used, possibly in conjunction with additional temporal and contextual information, to determine which of the identified segments are in fact associated with the particular video content. One or more of the extracted signatures may be, e.g., a visual frame signature based at least in part on a visual characteristic of a frame of the video segment, as determined using information based on DC and motion coefficients of the frame, or DC and AC coefficients of the frame. A given extracted signature may alternatively be an audio signature based at least in part on a characteristic of an audio signal associated with a portion of the video segment. Other types of signatures can also be used. Advantageously, the invention allows the identification and extraction of particular video content to be implemented with significantly reduced amounts of memory and computational resources.

17 Claims, 3 Drawing Sheets

AUTOMATIC SIGNATURE-BASED SPOTTING, LEARNING AND EXTRACTING OF COMMERCIALS AND OTHER VIDEO CONTENT

FIELD OF THE INVENTION

The present invention relates generally to video signal processing, and more particularly to techniques for processing video signals to identify and extract commercials or other types of video content having particular characteristics.

BACKGROUND OF THE INVENTION

Many different systems have been developed for the detection and extraction of commercials from broadcast or recorded video signals. For example, U.S. Pat. No. 4,782, 401 entitled "Editing Method and Apparatus for Commercials During Video Recording" describes a hardware-oriented solution for editing out commercials in the analog domain, based on the presence of dark or blank frames used to delineate commercials.

A similar system is described in PCT Application No. WO 83/00971, entitled "Reciprocating Recording Method and Apparatus for Editing Commercial Messages from Television Signals." This system edits out commercials based on fade-in and fade-out at the beginning and end, respectively, of a commercial break.

Another approach, described in U.S. Pat. No. 4,750,052 entitled "Apparatus and Method for Deleting Selected Program Intervals from Recorded Television Broadcasts," utilizes a fade detector to edit commercials from a recorded broadcast program.

PCT Application No. WO 94/27404, entitled "Method and Apparatus for Classifying Patterns of Television Programs and Commercials," uses feature extraction and a neural network to classify video signals. The system detects changes in features such as power amplitude over the frequency spectrum, color and brightness, vertical interval time code, closed caption signal, and color carrier jitter signal.

A system described in PCT Application No. WO 95/06985, entitled "Process and Device for Detecting Undesirable Video Scenes," stores an image from a broadcast program that precedes a commercial break so that the end of the commercial break may be detected by means of the stored image. This approach makes use of the fact that broadcasters often repeat a small part of the program after the end of the commercial break.

European Patent Application No. EP 735754, entitled "Method and Apparatus for the Classification of Television Signals," uses a set of features and associated rules to determine if the current commercials satisfy the same criteria with some degree of "fuzziness." The set of features includes, e.g., stereo versus mono, two-channel audio, sound level, image brightness and color, and logos, used to characterize commercials. An extensive set of rules is required to accommodate thresholds and parameter variations for these features.

U.S. Pat. No. 5,708,477, entitled "Video Signal Identifier for Controlling a VCR and Television Based on the Occurrence of Commercials," uses a video signal identifier to recognize previously-identified commercial material and to reject it either by muting the television sound and/or pausing the VCR when it is in record mode. A significant problem with this approach is that it fails to provide automatic detection, i.e., it requires the material to be identified in some way prior to its detection.

A system described in U.S. Pat. No. 5,668,917, entitled "Apparatus and Method for Detection of Unwanted Broadcast Information," uses the repetitiveness of commercials to identify commercial material. This system stores video frames in a compressed format and compares frames in original "raw" format pixel by pixel. If the pixels match, within some threshold, then the frames are considered similar. A serious drawback of this approach is the excessive memory and computational resources that it requires. More particularly, storing video even in a compressed format takes an impractically large amount of memory space, e.g., approximately 200 GB per day for one channel of high definition television (HDTV) content. In addition, comparing raw video is very time consuming. Even assuming that compressing and decompressing video can be implemented at no additional computational cost, comparing frames will be a very slow process. A given incoming frame must be compared with the above-noted large amounts of stored video material, and the comparison completed before the next frame arrives.

As is apparent from the above, a need exists for improved techniques for identification and extraction of commercials and other types of video content, which avoid the problems associated with the above-described conventional systems.

SUMMARY OF THE INVENTION

The invention provides improved techniques for spotting, learning and extracting commercials or other particular types of video content in a video signal. In accordance with the invention, a video signal is processed to identify segments that are likely to be associated with a commercial or other particular type of video content. A signature is extracted from each of the segments so identified, and the extracted signatures are used, possibly in conjunction with additional temporal and contextual information, to determine which of the identified segments are in fact associated with the particular type of video content. The temporal information may include, e.g., an indication of the amount of time elapsed between a given signature and a matching signature from a prior segment of the video signal. The contextual information may include, e.g., program information, such as program name, channel, time slot and rating, as obtained from an electronic programming guide or other information source.

One or more of the extracted signatures may be, e.g., a visual frame signature based at least in part on a visual characteristic of a frame of the video segment, as determined using information based on DC and motion coefficients of the frame, or based on DC and AC coefficients of the frame. Other visual frame signature extraction techniques may be based at least in part on color histograms. As another example, a given extracted signature may be an audio signature based at least in part on a characteristic of an audio signal associated with at least a portion of the video segment. Other signatures in accordance with the invention include, e.g., closed caption text describing an advertised product or service, a frame number plus information from a subimage of identified text associated with the frame, such as an 800 number, a company name, a product or service name, a uniform resource locator (URL), etc., or a frame number and a position and size of a face or other object in the image, as identified by an appropriate bounding box, as well as various combinations of these and other signature types.

In accordance with another aspect of the invention, a video processing system maintains different sets of lists of signatures, the sets of lists including one or more of a set of probable lists, a set of candidate lists and a set of found lists, with each entry in a given one of the lists corresponding to a signature associated with a particular video segment. The sets of lists are updated as the various extracted signatures are processed. For example, a given one of the signatures identified as likely to be associated with the particular video content is initially placed on one of the probable lists if it does not match any signature already on one of the probable lists. If the given signature matches a signature already on one of the probable lists, the given signature is placed on one of the candidate lists. A given one of the signatures on a candidate list is moved to a found list if it matches a signature already on one of the candidate lists. A given signature may also be removed from one or more of the lists in the event that the signature is not repeated within a designated time period.

In accordance with a further aspect of the invention, the system may be configured to involve a user in the commercial spotting, learning and extraction process. For example, a user remote control for use with a television, set-top box or other video processing system may be configured to include a "never again" button, such that when the user presses that button, the commercial signature is automatically extracted and stored directly to a particular found list, without first passing through the above-noted probable and candidate lists.

In accordance with yet another aspect of the invention, particular user actions can be detected and used to trigger the automatic extraction of a signature from a given segment of a video signal. For example, the system can be configured to automatically extract a signature from a portion of a video signal that a user fast-forwards through when watching a playback of a previously-recorded broadcast.

Advantageously, the invention allows commercials and other types of video content to be identified, learned by the system and extracted, with a significantly reduced complexity relative to the above-noted conventional systems. More particularly, through the use of extracted signatures, the invention reduces the amount of memory and computational resources required to implement video content identification and extraction. These and other features and advantages of the present invention will become more apparent from the accompanying drawings and the following detailed description.

DETAILED DESCRIPTION OF THE INVENTION

Figure 1:
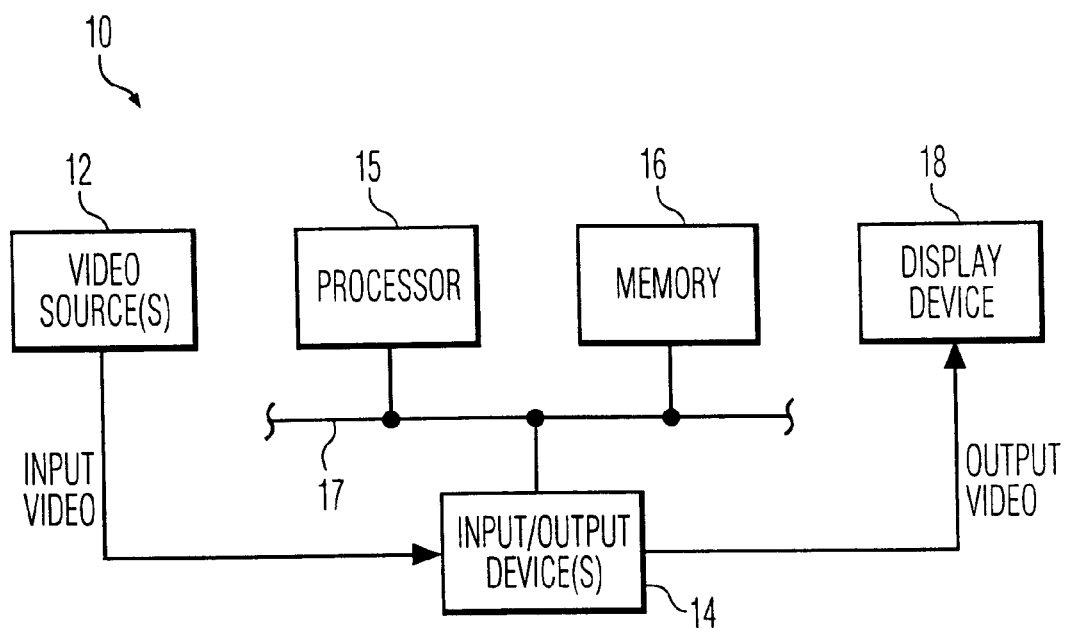
FIG. 1 is a block diagram of a video processing system in which the invention may be implemented.

FIG. 1 shows a video processing system 10 in which video spotting, learning and extraction techniques in accordance with the present invention may be implemented. The system 10 may represent a television, a set-top box, a desktop, laptop or palmtop computer, a personal digital assistant (PDA), a video storage device such as a video cassette recorder (VCR), a digital video recorder (DVR), a TiVO device, etc., as well as portions or combinations of these and other devices. The system 10 includes one or more video sources 12, one or more input/output devices 14, a processor 15 and a memory 16. The video source(s) 12 may represent, e.g., a television receiver, a VCR or other video storage device, or any other type of video source. The source(s) 12 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 14, processor 15 and memory 16 communicate over a communication medium 17. The communication medium 17 may represent, e.g., a bus, a communication network, one or more internal connections of a circuit, circuit card or other device, as well as portions and combinations of these and other communication media. Input video from the source(s) 12 is processed in accordance with one or more software programs stored in memory 16 and executed by processor 15 in order to generate output video which is supplied to a display device 18, which may be, e.g., a television display, a computer monitor, etc.

It should be understood that the particular configuration of system 10 as shown in FIG. 1 is by way of example only. Those skilled in the art will recognize that the invention can be implemented using a wide variety of alternative system configurations.

The present invention provides improved techniques for spotting, learning and extraction of commercials or other types of video segments. Advantageously, the techniques of the invention can be implemented without excessively high memory or computational requirements.

The following is an example of a process for spotting, learning and extracting commercials from a broadcast video signal in accordance with the invention. It is assumed for this example that the input video comprises a broadcast video signal including at least one program and multiple commercials.

Step 0. While there is input video perform the following Steps 1 through 5:

Step 1. Detect unusual activity segments in the broadcast video signal. This may involve, e.g., detecting a high cut rate area in the broadcast video signal, or detecting an area of high text activity. Other examples include detecting a fast change in the visual domain by accumulating color histograms, detecting a rise in the audio level, or detecting fast changes in the audio from music to speech, from one rhythm to another, etc.

Step 2. The segments identified in Step 2 as including unusual activity are further processed to determine if they are likely to be associated with a commercial. The segments so determined are then marked. Examples of features that may be used in making this determination include:

(a) Displayed text corresponding to entries in a stored text file of known company names, product or service names, 800 numbers or other telephone numbers, uniform resource locators (URLs), etc. that are associated with commercials.

(b) Speech. In this case, the speech may be extracted, converted to text and the resulting text analyzed against the above-noted stored text file to detect known company names, product or service names, 800 numbers or other telephone numbers, URLs, etc.

(c) Absence of closed caption information combined with high cut rate.

(d) Closed caption information containing multiple blank lines.

(e) Completion of ending credits for a movie, show or other program.

(f) Average keyframe distance or average cut frame distance trend, e.g., an increasing or decreasing trend.

(g) Absence of logos, e.g., superimposed video logos identifying the broadcaster.

(h) Different font types, sizes and colors for superimposed text.

(i) Rapid changes in color palette or other color characteristic.

Signatures are then extracted from keyframes in the marked segments and placed in a particular "probable" list of signatures. The term "keyframe" as used herein refers generally to one or more frames associated with a given shot or other portion of a video signal, e.g., a first frame in a particular shot. Examples of probable lists of signatures include the lists L1, Li, Ln, etc. referred to in the flow diagram of FIG. 2. During a first pass through Step 2, a given one of the probable lists will generally include signatures for multiple commercials as well as for portions of the program.

A given signature may be based on, e.g., a visual frame signature or an audio signature, or on other suitable identifying characteristics. A visual frame signature can be extracted using, e.g., an extraction method based on DC and AC coefficients (DC+AC), an extraction method based on DC and motion coefficients (DC+M), or other suitable extraction methods, e.g., methods based on wavelets and other transforms.

The above-noted DC+AC method is described in greater detail in, e.g., N. Dimitrova, T. McGee and H. Elenbaas, "Video Keyframe Extraction and Filtering: A Keyframe is not a Keyframe to Everyone," Proceedings of ACM Conference on Information and Knowledge Management, November 1997, and may be used to generate a visual frame signature comprising, e.g., a DC coefficient and five AC coefficients.

As another example, the above-noted DC+M method may be used to generate a set of signatures of the form (keyframe1, signature1, keyframe2, signature2, etc.). This DC+M extraction method is described in greater detail in, e.g., U.S. Pat. No. 5,870,754 issued Feb. 9, 1999 in the name of inventors N. Dimitrova and M. Abdel-Mottaleb, and entitled "Video Retrieval of MPEG Compressed Sequences Using DC and Motion Signatures," and N. Dimitrova and M. Abdel-Mottaleb, "Content-Based Video Retrieval By Example Video Clip," Proceedings of Storage and Retrieval for Image and Video Databases V, SPIE Vol. 3022, pp. 59–70, San Jose, Calif., 1997.

Other visual frame signature extraction techniques may be based at least in part on color histograms, as described in, e.g., N. Dimitrova, J. Martino, L. Agnihotri and H. Elenbaas, "Color Super-histograms for Video Representation," IEEE International Conference on Image Processing, Kobe, Japan 1999.

An audio signature Ai may comprise information such as pitch (e.g., maximum, minimum, median, average, number of peaks, etc.), average amplitude, average energy, bandwidth and mel-frequency cepstrum coefficient (MFCC) peaks. Such a signature may be in the form of, e.g., a single object A1 extracted from the first 5 seconds from a commercial. As another example, the audio signature could be a set of audio signatures {A1, A2, . . . An} extracted from, e.g., a designated time period following each identified cut.

The invention can also utilize numerous other types of signatures. For example, another type of signature may be in the form of closed caption text describing an advertised product or service. As another example, the signature could be in the form of a frame number plus information from a subimage of identified text associated with the frame, such as an 800 number, company name, product or service name, URL, etc. As yet another example, the signature could be a frame number and a position and size of a face or other object in the image, as identified by an appropriate bounding box. Various combinations of these and other types of signatures could also be used.

Step 3. Whenever a new potential commercial segment is detected, the signature of that segment is compared with the other signatures on the probable lists, as is described in greater detail in conjunction with the flow diagram of FIG. 2. If the new signature does not match any signature already on one of the probable lists, then the new signature is added to a probable list. If the new signature matches one or more signatures on one of the probable list, then the one or more signatures are placed in a particular "candidate" list of signatures. Examples of candidate lists of signatures include the lists C1, Cj, Cm etc. referred to in the flow diagram of FIG. 2.

It should be noted that if the new signature is not similar to any signature for a segment more than about 30 seconds or less than about 10 minutes prior in time, but is similar to a signature for a segment about 10–13 minutes prior in time, there is an increased likelihood that it may be part of a commercial. In other words, this temporal relationship between similar signatures reflects the fact that a given probable list may include commercial segments spaced a designated approximate amount of time apart, e.g., 10 minutes apart. This temporal spacing relationship may be determined experimentally for different types of programs, broadcast time slots, countries, etc.

Other types of temporal or contextual information may be taken into account in the comparison process. For example, if a particular signature appears in approximately the same time slot on one day as it did on a previous day, it may be more likely to be associated with a commercial. One could also divide the lists into different groups for different day, time or channel slots so as to facilitate the comparison process. For example, shows for children are generally run during early morning time slots and would most likely have different commercials than an evening program such as Monday Night Football. An electronic programming guide (EPG) implemented in the system 10 could be used to provide this and other information. For example, a signature could be associated with a particular show name and rating, resulting in an arrangement such as (show name, rating, channel, keyframe1, signature, keyframe5, signature, etc.). Program category information from the EPG could also be used to help in identifying commercials in the lists.

Step 4. Whenever a new potential commercial segment is detected, the signature of that segment is also compared with the signatures on the above-noted candidate lists. If the new signature matches a signature on one of the candidate lists, the new signature is moved to a particular "found commercial" list, also referred to herein as a permanent list. Examples of found commercial lists are the lists P1 and Pk referred to in the flow diagram of FIG. 2.

Step 5. If there is at least one signature on a given found commercial list, the signature of any new potential commercial segment is first compared to the to signature(s) on that list. If a match is found, a commercial frequency counter associated with the corresponding signature is incremented by one. If there is no match with a signature on a found commercial list, the new signature is then compared with the signatures on one or more of the candidate lists. If a match is found for the new signature on a given one of the candidate lists, the new signature is placed on a commercial found list as per Step 4. If there is no match with any signature on a candidate list, the new signature is placed on one of the probable lists. A more detailed description of this process is provided in the flow diagram of FIG. 2.

The above-noted counter for the signatures on a found commercial list can be monitored to determine how frequently it is incremented, and the results used to provide further commercial identification information. For example, if the counter is incremented within a relatively short period of time, on the order of about 1–5 minutes, it is probably not a commercial. As another example, if the counter is not incremented for a very long time, e.g., on the order of a week or more, then the counter may be decremented, such that the commercial is eventually "forgotten" by the system. This type of temporal relationship policy can also be implemented for the signatures on the above-noted probable lists.

The signature counter can also be used in other applications, e.g., it can be used by advertisers to determine how many times a given commercial has been aired.

Figure 2:
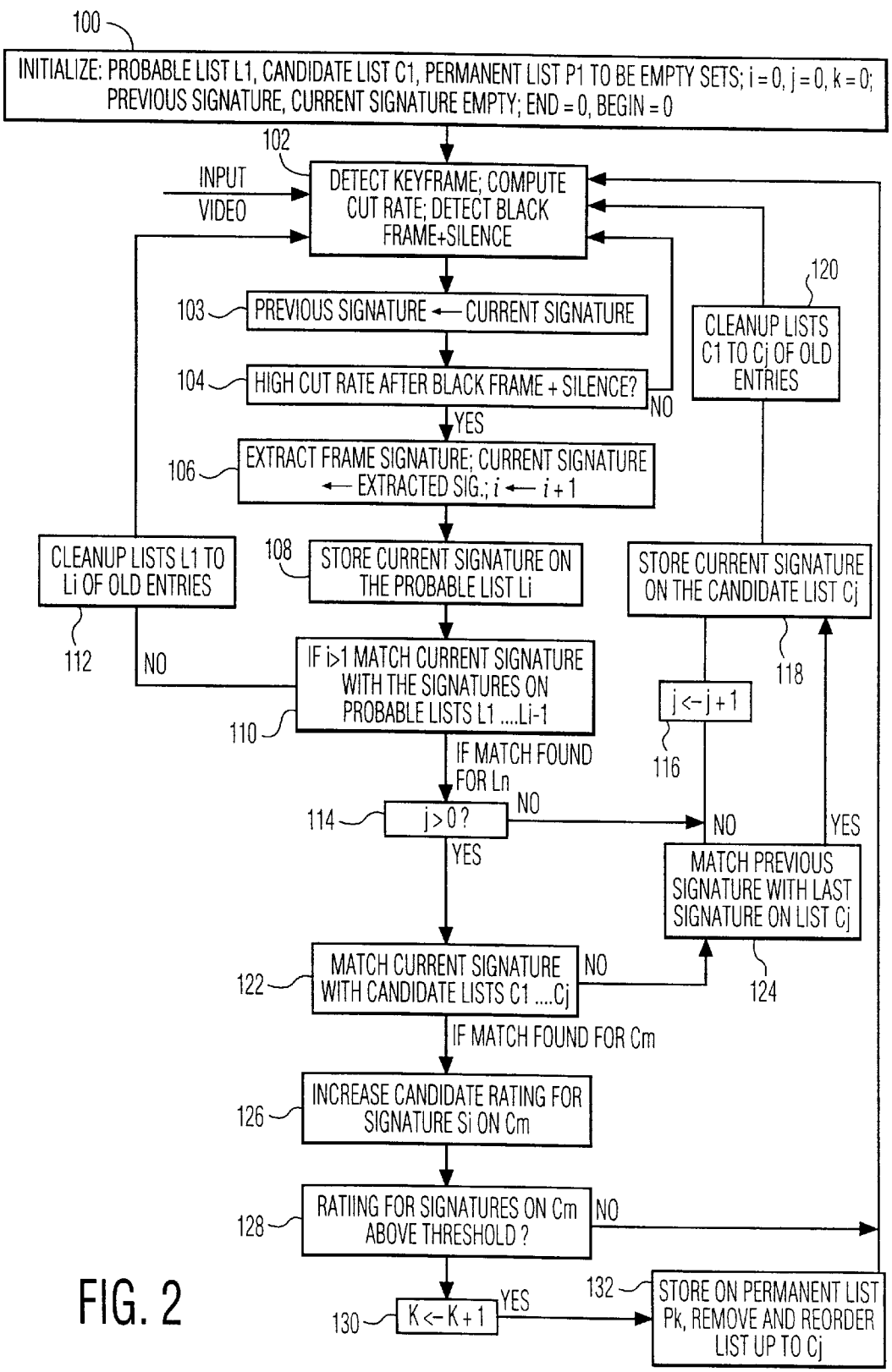
FIGS. 2 and 3 are flow diagrams of learning and matching processes, respectively, in accordance with an illustrative embodiment of the invention that may be implemented in the video processing system of FIG. 1.
Figure 3:
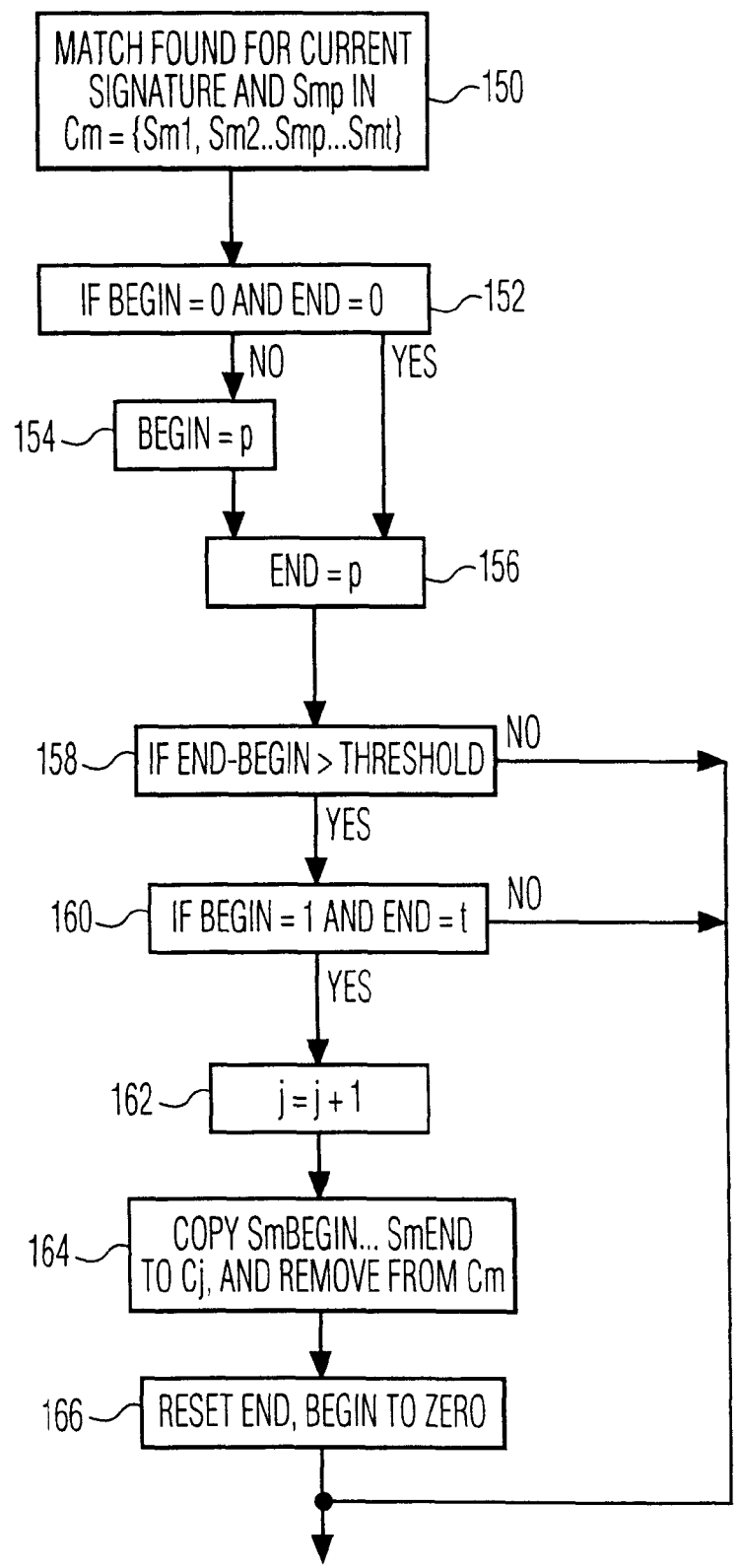

FIGS. 2 and 3 show more detailed examples of learning and matching processes, respectively, for use in the above-described commercial spotting, learning and extracting process. It should be noted that although this illustrative embodiment of the invention is configured to utilize visual signatures, the described techniques are also applicable to other types of signatures, including audio signatures. Referring to FIG. 2, an initialization step 100 initializes a first probable list L1, a first candidate list C1 and a first permanent list P1 to empty sets, and the variables i, j and k to zero. The initialization step 100 also sets variables "previous signature" and "current signature" to empty.

In step 102, input video is processed to detect a keyframe, compute a cut rate, and detect a black frame in conjunction with silence. In step 103, the previous signature is set to the current signature. Step 104 determines if there is a high cut rate after a black frame with silence. If there is, a visual frame signature is extracted, the current signature is set to the extracted signature, and the index i is incremented by one, as shown in step 106. The current signature is then stored in the probable list Li in step 108. If there is no high cut rate after a black frame with silence, step 102 is repeated until such a condition is detected. The processing operations of step 102 continue as long as there is input video present.

As previously noted, many other techniques could be used in step 102, in conjunction with or in place of cut rate and black frame plus silence detection, to identify areas of the input video which are likely to be associated with commercials.

If the index i is greater than one, step 110 attempts to match the current signature with the signatures stored in probable lists L1, . . . Li−1. If no match is found, the probable lists L1 to Li are cleaned of old entries in step 112, and the process returns to step 102. The old entries may be identified as those entries which have been present in the probable lists for more than a certain predetermined amount of time. If a match is found in step 110 between the current signature stored in Li and another signature, e.g., a signature stored in Ln, step 114 determines if the index j is greater than zero. If j is not greater than zero, step 116 increments index j, and then the current signature is stored in the candidate list Cj, as indicated in step 118. The candidate lists C1 to Cj are then cleaned of old entries in step 120, and the process returns to step 102 to attempt to identify another high cut rate after a black frame with silence.

If step 114 determines that the index j is greater than zero, step 122 attempts to match the current signature with the candidate lists C1, . . . Cj. If no match is found in step 122, step 124 attempts to match the previous signature with the last signature on Cj. If step 124 results in no match, steps 116, 118 and 120 are performed, and the process returns to step 102. If step 124 results in a match, steps 118 and 120 are performed, and the process then returns to step 102.

If a match is found in step 122 between the visual signature stored in Li and a signature on a candidate list, e.g., a signature stored in Cm, step 126 increases the candidate rating for the signature Si stored in candidate list Cm. Step 128 then determines if the rating for any signature in Cm is above a specified threshold. If not, the process returns to step 102. If a rating for one or more signatures in Cm is above the threshold, index k is incremented in step 130, the signature(s) in Cm are removed from that candidate list and stored in the permanent list Pk, and the candidate lists are then reordered up to Cj, as shown in step 132, after which the process returns to step 102.

FIG. 3 shows in greater detail an illustrative process for matching a current signature to signatures in the candidate lists C1, . . . Cm, and corresponds generally to step 122 of the FIG. 2 process. The FIG. 3 matching process is designed to locate a match between the current signature and, e.g., a middle signature in a set of signatures on a given candidate list. In step 150, a match is found between the current signature and a previously-stored signature Smp in the list Cm={Sm1, Sm2, . . . Smp . . . Smt}. Step 152 then determines if variables "begin" and "end" are each equal to zero. These variables are used to designate the beginning and ending, respectively, of a single commercial if multiple commercials are found in a given candidate list, and are initialized to zero in the above-noted initialization step 100. If either begin or end is not equal to zero, then both are set to a value p, as indicated in steps 154 and 156, where p is the index value associated with signature Smp. If both begin and end are equal to zero, begin retains its zero value, and the value of end is set to p in step 156.

Step 158 then compares the difference between end and begin to a specified threshold. If the difference end-begin is greater than the threshold, and if step 160 determines that begin is equal to one and end is equal to a specified time t, then the index j is incremented in step 162. Step 164 then copies the signatures Smbegin, . . . Smend to candidate list Cj, and removes those signatures from candidate list Cj−1. Step 166 then resets both end and begin to zero, and the FIG. 3 process ends and returns to the appropriate point, i.e., step 122, in the FIG. 2 process. If end-begin is determined to be less than the threshold in step 158, or if begin is not equal to one or end is not equal to t in step 160, the FIG. 3 process ends and returns to step 122 of FIG. 2.

Once the commercials or other types of video content have been identified and learned by the system using the above-described techniques, conventional approaches for editing or otherwise extracting the commercials, e.g., by muting a television, fast-forwarding through a recorded broadcast, etc., can be applied in a straightforward manner.

Other embodiments of the invention can involve the user in the commercial spotting, learning and extraction process. For example, a user remote control for use with the above-described system may be configured to include a "never again" button, such that when the user presses that button, the commercial signature is automatically extracted and stored directly to a particular P list, without first passing through the L and C lists. In other embodiments, particular user actions can be detected and used to trigger the automatic extraction of a signature from a given segment of a video signal. For example, the system can be configured to automatically extract a signature from a portion of a video signal that a user fast-forwards through when watching a playback of a recorded broadcast, TiVO output, etc.

Information from a service provider, such as a list of commercials, may also be used in a commercial spotting, learning and extraction process in accordance with the invention. For example, a service provider may provide information such as previously-extracted signatures to a user device to facilitate identification and extraction of the corresponding video content.

As previously noted, the invention substantially reduces the memory and computational resources required for identification and extraction of commercials or other types of video content. For example, the above-described signatures may be configured so as to require no more than a few hundred bytes of memory per frame, and a reduction in computational resources of up to several orders of magnitude relative to conventional techniques.

The above-described embodiments of the invention are intended to be illustrative only. For example, the invention can be used to implement spotting, learning and extraction for other types of image signals, in any desired type of video processing system or device, and in many applications other than those described herein. The invention can also be implemented at least in part in the form of one or more software programs which are stored on an otherwise conventional electronic, magnetic or optical storage medium or other type of memory and executed by a processing device, e.g., by the processor 15 of system 10 in FIG. 1. These and numerous other embodiments within the scope of the following claims will be apparent to those skilled in the art.

What is claimed is:

1. A method for processing a video signal, the method comprising the steps of:

identifying a plurality of segments of the video signal that are likely to be associated with a particular type of video content; and extracting a signature from each of at least a subset of the one or more identified segments, wherein the extracted signatures are utilized to determine which of the identified segments are associated with the particular type of video content, wherein the signature extracted from a given one of the video segments comprises a visual frame signature based at least in part on a visual characteristic of a frame of the video segment, and wherein the visual frame signature is extracted using information based on DC and motion coefficients of the frame.

2. A method for processing a video signal, the method comprising the steps of:

identifying a plurality of segments of the video signal that are likely to be associated with a particular type of video content; and extracting a signature from each of at least a subset of the one or more identified segments, wherein the extracted signatures are utilized to determine which of the identified segments are associated with the particular type of video content, wherein the signature extracted from a given one of the video segments comprises a visual frame signature based at least in part on a visual characteristic of a frame of the video segment, and wherein the visual frame signature is extracted using information based on DC and AC coefficients of the frame.

3. The method of claim 2 wherein the identifying step comprises the steps of determining if a given one of the segments includes at least one of a black frame combined with silence in its associated audio signal, a cut rate exceeding a specified value, a specified change in a color characteristic, a specified change in a characteristic of the associated audio, a specified type of text, a specified type of speech, an absence or particular type of closed caption information, and an absence of a superimposed video logo.

4. The method of claim 2 wherein the particular type of video content comprises a commercial in a broadcast program.

5. The method of claim 2 wherein the signature extracted from a given one of the video segments comprises an audio signature based at least in part on a characteristic of an audio signal associated with at least a portion of the video segment.

6. The method of claim 2 wherein the signature extracted from a given one of the video segments comprises at least one of a histogram, closed caption text, a company name, a product or service name, a telephone number, a uniform resource locator, a frame number in conjunction with text box position, color or character code information, and a frame number in conjunction with face or other object position information.

7. The method of claim 2 further including the step of utilizing temporal information relating to the identified segments to determine which of the identified segments are associated with the particular type of video content.

8. The method of claim 2 further including the step of maintaining a set of lists of signatures, the set of lists including one or more of at least one probable list, at least one candidate list and at least one found list, with each entry in a given one of the lists corresponding to a signature associated with a particular video segment.

9. The method of claim 8 wherein a given one of the signatures of a segment identified as likely to be associated with the particular video content is initially placed on a given probable list if it does not match any signature already on one or more probable lists.

10. The method of claim 9 wherein a given one of the signatures of a segment identified as likely to be associated with the particular video content is placed on a given candidate list if it matches a signature already on one or more of the probable lists.

11. The method of claim 10 wherein a given one of the signatures on the given candidate list is moved to a given found list if it matches a signature already on one or more of the candidate lists.

12. The method of claim 8 wherein a given one of the signatures is removed from at least one of the lists if it is determined that the signature has not been repeated within a specified time period.

13. The method of claim 2 further including the step of automatically extracting a signature from a particular segment of the video signal in response to a user command identifying the particular segment as associated with the particular type of video content.

14. The method of claim 2 further including the step of automatically extracting a signature from a particular segment of the video signal in response to detection of a user action relating to the particular segment.

15. The method of claim 14 wherein user action comprises fast forwarding through at least a portion of the particular segment.

16. A method for processing a video signal, the method comprising the steps of:

identifying a plurality of segments of the video signal that are likely to be associated with a particular type of video content;

extracting a signature from each of at least a subset of the one or more identified segments, wherein the extracted signatures are utilized to determine which of the identified segments are associated with the particular type of video content; and utilizing program identification information from an electronic programming guide in conjunction with the extracted signatures to determine which of the identified segments are associated with the particular type of video content.

17. The method of claim 16 wherein the program identification information comprises at least one of a program name, a program channel, a program time slot and a program rating.

* * * * *